United States Patent [19]

Shatila et al.

[11] 4,056,345

[45] Nov. 1, 1977

[54] DOUGH FORMING APPARATUS

[75] Inventors: Mounir A. Shatila; William H. VonDer Lieth, both of Blackfoot; John L. Veeneman; Marion E. Thomas, both of Idaho Falls, all of Idaho

[73] Assignee: AMPCO Foods Inc., San Francisco, Calif.

[21] Appl. No.: 744,530

[22] Filed: Nov. 24, 1976

Related U.S. Application Data

[62] Division of Ser. No. 507,602, Sept. 19, 1974, abandoned.

[51] Int. Cl.[2] .................. A21C 11/18; A21C 3/04
[52] U.S. Cl. .................. 425/186; 222/386.5; 425/190; 425/192 R; 425/311
[58] Field of Search ............. 425/307, 308, 316, 168, 425/185, 182, 190, 192 R, 161, 311, 186; 222/327, 386, 386.5, 326

[56] References Cited

U.S. PATENT DOCUMENTS

| 1,955,342 | 4/1934 | Pizzini et al. | 425/190 |
|---|---|---|---|
| 1,964,623 | 6/1934 | Durand | 222/386 X |
| 1,999,926 | 4/1935 | Garzia | 425/190 X |
| 2,351,493 | 6/1944 | Curry | 425/192 X |
| 2,531,366 | 11/1950 | Smith | 222/386.5 X |
| 3,029,985 | 4/1962 | Krueger et al. | 222/327 |
| 3,075,675 | 1/1963 | Wormser et al. | 222/327 |
| 3,503,342 | 3/1970 | Ilines | 425/192 |
| 3,685,936 | 8/1972 | Meth et al. | 425/192 |
| 3,771,937 | 11/1973 | Harmon et al. | 425/161 |

Primary Examiner—Francis S. Husar
Assistant Examiner—William R. Briggs
Attorney, Agent, or Firm—Thomas H. Olson

[57] ABSTRACT

A horizontal chamber and a piston movable in the chamber to discharge potato dough through a discharge opening at one end of the chamber. A dough dividing structure adapted for mounting in the discharge opening. A diaphragm and means for mounting the diaphragm on the face of the piston such that when the piston is retracted in the chamber from a body of dough therein, an air passage is created to relieve the vacuum between the diaphragm and the dough, thereby avoiding distortion of the dough. For charging the chamber with a body of dough to form an impervious barrier therein there is an adapter in vertical alignment below the constitutent introducing devices; the adapter supports the piston and the cylinder in vertical alignment below the constituent introducing devices so as to expedite charging of the machine to form an impervious dough barrier. After the constituents set into a dough the chamber, with the impervious barrier therein, and the piston are installed in the machine for normal operation. An improved nozzle for introducing the water constituent which nozzle virtually eliminates all kinetic energy or velocity necessarily developed when the water is delivered to the nozzle.

13 Claims, 10 Drawing Figures

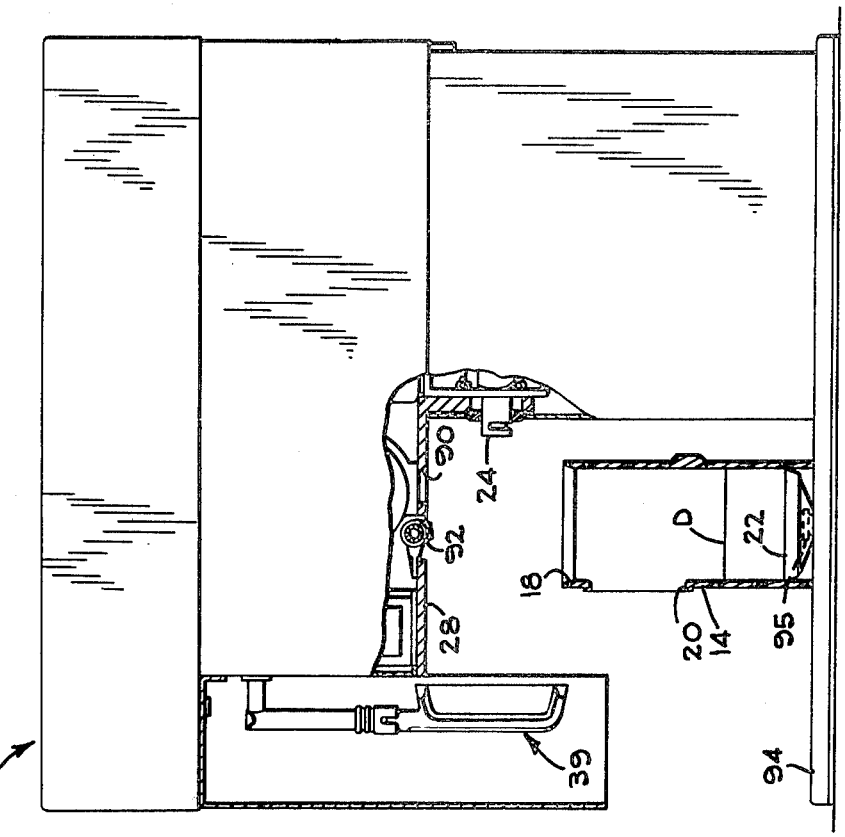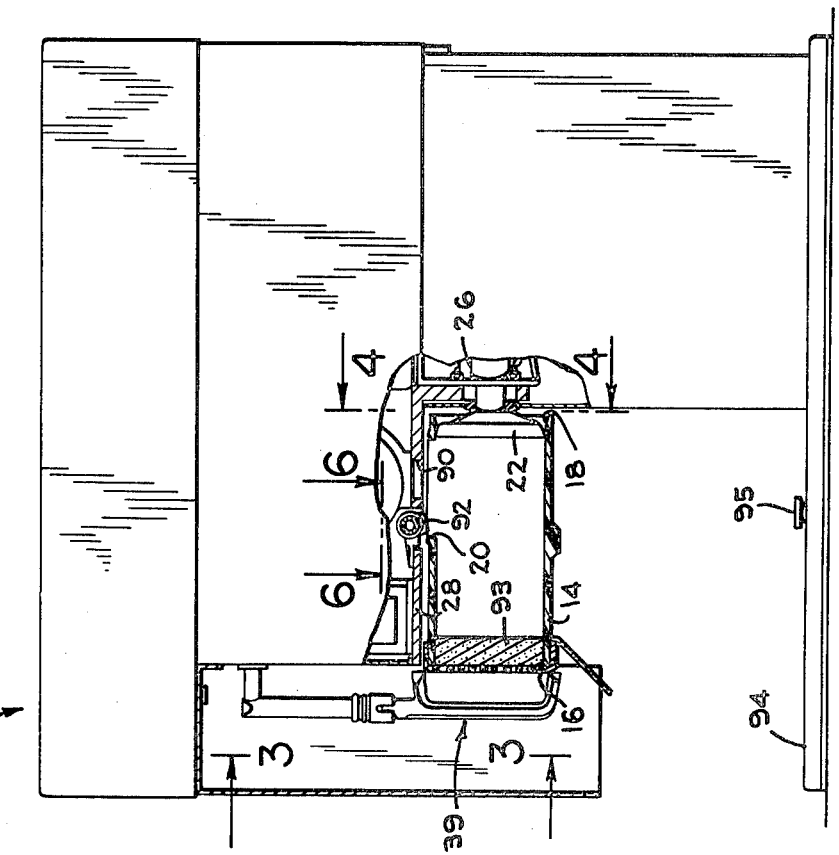

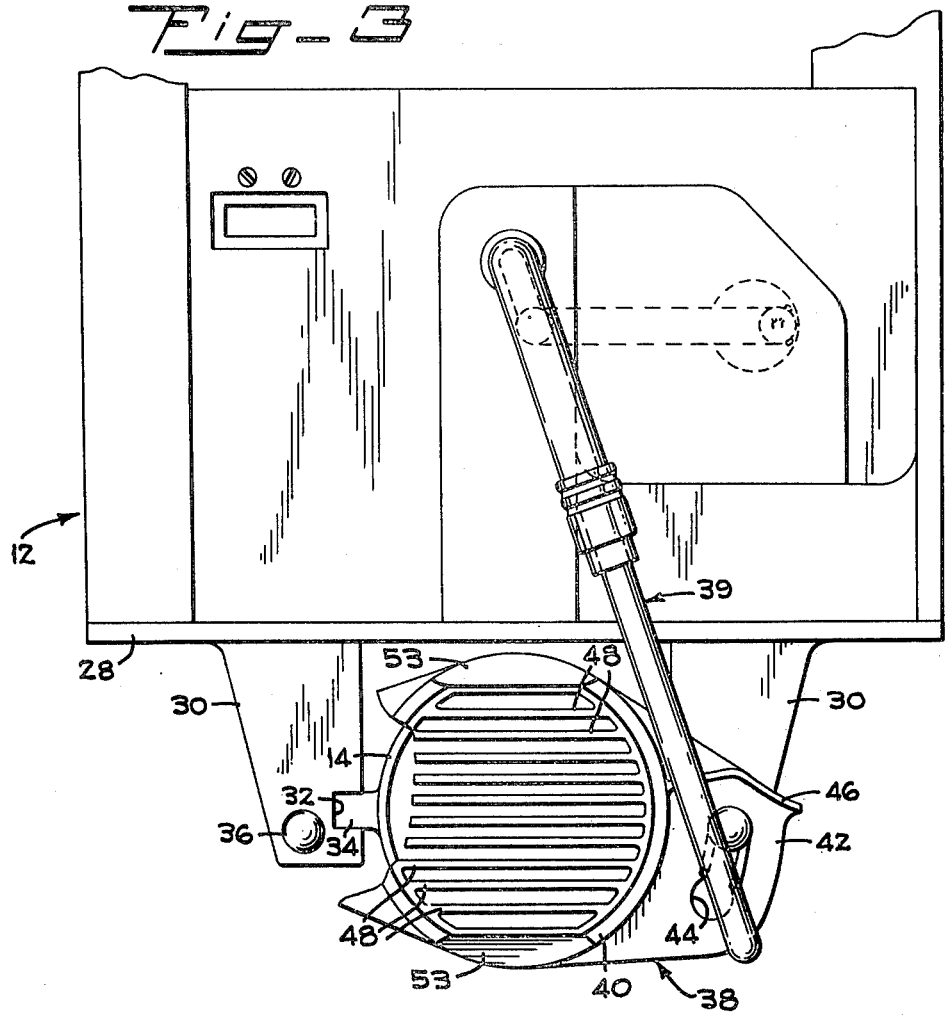

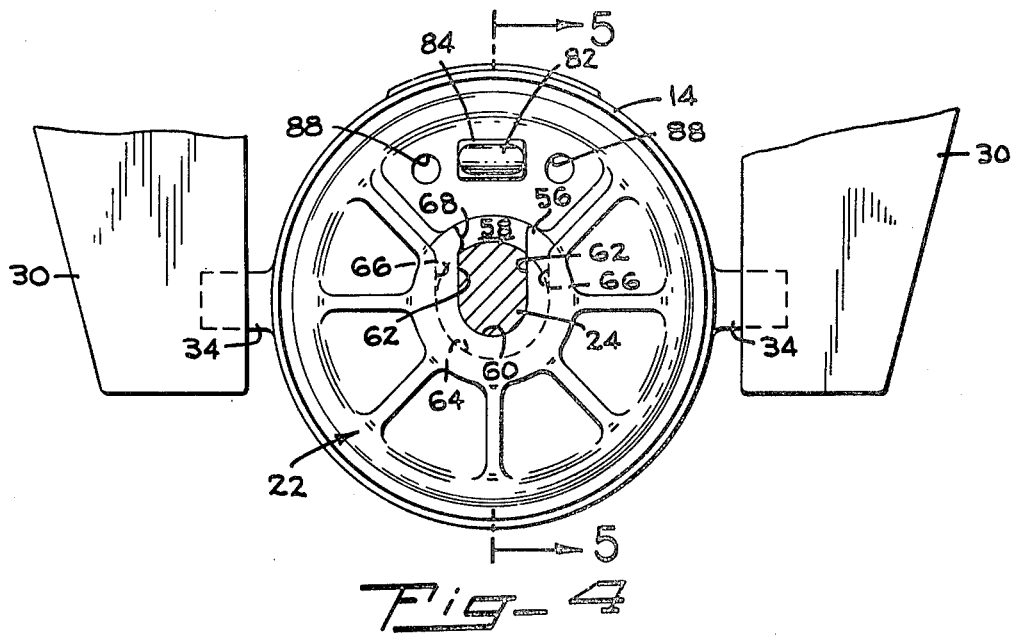
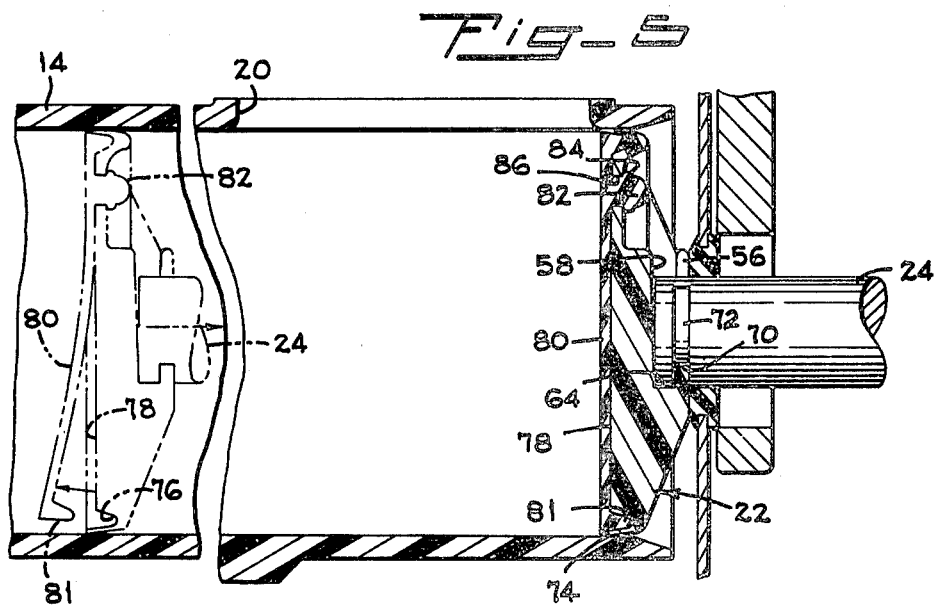

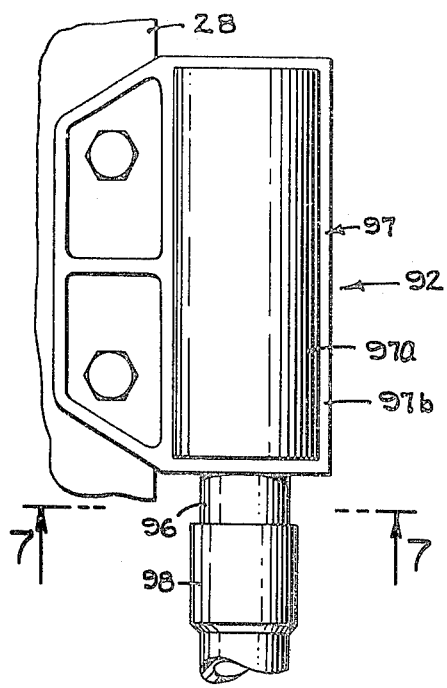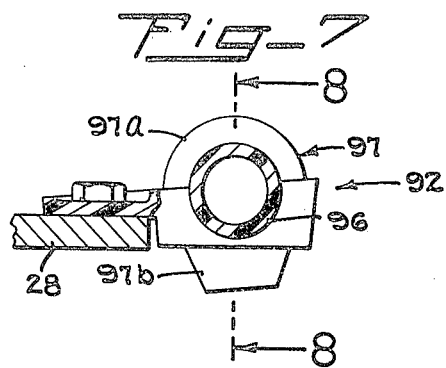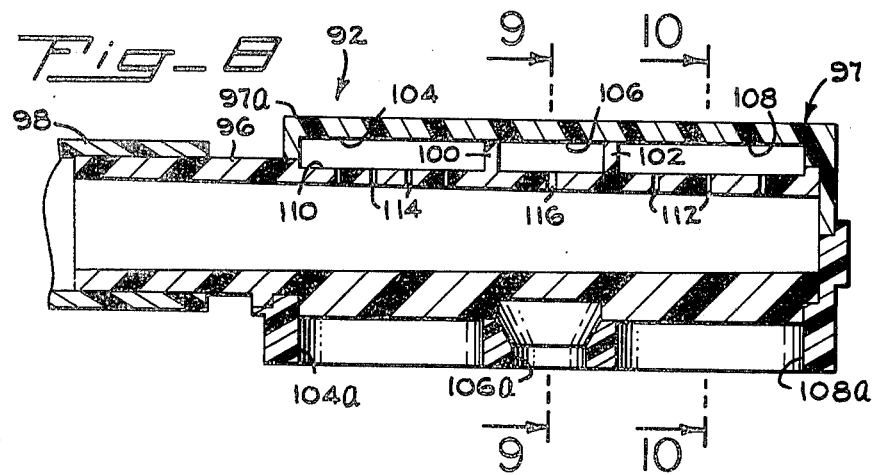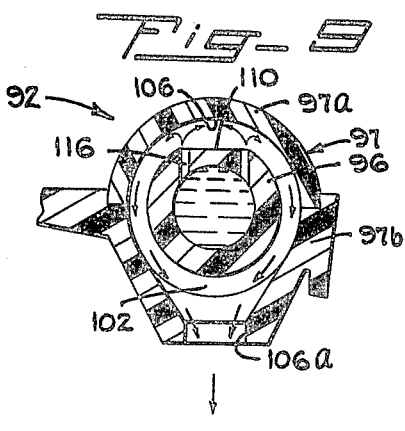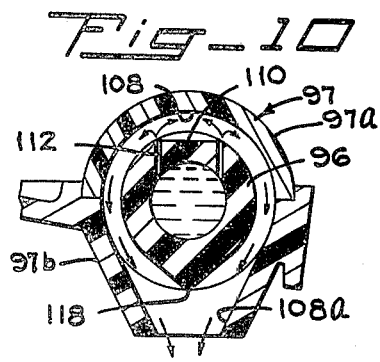

DOUGH FORMING APPARATUS

CROSS-REFERENCE TO RELATED APPLICATION

This is a Division of U.S. Pat. application, Ser. No. 507,602, filed Sept. 19, 1974, now abandoned.

BACKGROUND OF THE INVENTION

1. Field of the Invention

This invention relates to method and apparatus for forming shaped potato bodies, such as french fry shaped pieces, by reconstituting dry potato agglomerates with water to form a dough and then by shaping the dough into appropriate shaped pieces.

2. Description of the Prior Art

U.S. Pat. No. 3,622,355 discloses an agglomerated potato product that can be rehydrated into a potato dough by addition of water thereto and without substantial physical agitation. U.S. Pat. Nos. 3,605,647 and 3,771,937 disclose apparatus for automatically rehydrating the agglomerated potato product into a dough and forming it into french fry shaped pieces of uniformly high quality.

SUMMARY OF THE INVENTION

The present invention provides improvements in the above noted prior art teachings which enhance the quality and uniformity of the product, and simplify the operation and maintenance of the apparatus employed to form the product.

The above noted U.S. Pat. Nos. 3,605,647 and 3,771,937 patents disclose an apparatus in which a plurality of thin wire strands span the discharge opening of a chamber; when potato dough is moved from the chamber through the spaces between the strands, it is divided into strips which are then transversely separated to form french fry shaped bodies. As explained in the 3,605,647 patent, it is desirable that the open area between the strands occupies a substantial proportion of the total area of the discharge opening so that the dough can be moved through the opening without applying substantial pressure thereto.

Another object of the present invention is to simplify the formation of an impervious barrier within the chamber which barrier is essential during automatic operation of the apparatus wherein water and dry potato agglomerates are deposited in the chamber and must there be retained until the constituents set into a firm self-supporting dough. Achievement of this object can best be appreciated by comparing the techniques disclosed in the aforecited patents. In the U.S. Pat. No. 3,605,647 patent a body of dough, equal in volume to a full dough charge is retained in the chamber. A special adapter plug of equivalent volume is necessary in charging the apparatus after the same has been cleaned. The U.S. Pat. No. 3,771,937 patent discloses an externally disposed seal plate and linkage for moving the seal plate into and out of sealing relationship of the discharge opening. By way of contrast, the present invention provides a piston supporting stud in vertical alignment below the constituent introducing devices in the apparatus. Thus, to charge the apparatus in order to form an impervious barrier, the piston is removed from its operating rod and placed on the stud, the chamber is placed over the piston in a vertical orientation, the constituents are introduced into the chamber, the constituents are permitted to set into a dough, and then the piston and chamber are reassembled in their normal operative positions in the apparatus for regular operation.

A feature and advantage of achieving the last stated object is that the adapter plug structure on the one hand and the seal plate and its operating linkage on the other hand are eliminated so that the machine is simplified and there are no loose parts to be cleaned or otherwise cared for.

A further object of the present invention which also tends to simplify and expedite automatic operation of the machine is to preserve the integrity of the impervious dough barrier when the piston is retracted preparatory to receiving a charge of dry product and water thereinto. Because the dough body is substantially impervious and somewhat moist, and because the piston of necessity is sealed in its movement within the chamber, a vacuum can form on retraction of the piston away from the dough body, which vacuum can distort or destroy the integrity of the dough body. According to the present invention, the piston is provided with a flexible impervious diaphragm on the face thereof. The diaphragm is secured to the piston at only one location so that portions of the diaphragm remote from such location can separate from the piston and from the dough body. The piston has one or more airvents therethrough which are sealed when the diaphragm lies against the piston surface but which are opened when the diaphragm is pulled away from the piston surface, as it is during retraction of the piston and diaphragm from the dough charge. Thus, the integrity of the impervious barrier formed by the dough body is not adversely affected when the piston is withdrawn, because the vacuum tending to form as a consequence thereof is almost immediately relieved.

Yet another object of the present invention is to provide a water nozzle which introduces water into the chamber without significant kinetic energy or velocity so as to avoid turbulence within the dry product which would, unless compensated for, tend to produce nonuniform wetting of the dry product. As described in the 3,771,937 patent, water is delivered from a heating tank to the nozzle through a pump which of necessity imparts substantial kinetic energy to the water. Such kinetic energy is almost totally dissipated by the nozzle of the present invention, which nozzle includes inner and outer concentric tubular members, an inlet at one end of the inner tubular member, openings at the top of the inner member for affording flow of water into the annular space between the two members and relatively large area openings at the bottom of the outer member for discharging the water from the nozzle. The water that is supplied to the inner tubular member with substantial kinetic energy exits the slots in the outer tubular member by the force of gravity and without substantial kinetic energy.

A feature and advantage of the nozzle of the present invention is that it can introduce a substantial quantity of water into the chamber in a short time and without significant kinetic energy or velocity which would tend to result in nonuniform wetting of the dry product in the chamber.

The foregoing, together with other objects, features and advantages, will be more apparent after referring to the following specification and accompanying drawings.

BRIEF DESCRIPTION OF THE DRAWINGS

FIG. 1 is a side elevation view of dough forming and shaping apparatus, portions being broken away to reveal internal details.

FIG. 2 is a view similar to FIG. 1 with the dough chamber in a position to afford charging the same with an initial quantity of dough to form an impervious barrier within the chamber.

FIG. 3 is a view taken along line 3—3 of FIG. 1.

FIG. 4 is a view taken along line 4—4 of FIG. 1 and showing the mechanism for mounting the piston onto the piston rod.

FIG. 5 is a cross sectional view taken along the line 5—5 of FIG. 4.

FIG. 6 is a plan view of the improved nozzle of the present invention taken along line 6—6 of FIG. 1.

FIG. 7 is a cross sectional view taken along line 7—7 of FIG. 6.

FIG. 8 is a longitudinal cross sectional view of the nozzle taken along line 8—8 of FIG. 7.

FIG. 9 is a cross sectional view of the nozzle taken along line 9—9 of FIG. 8.

FIG. 10 is a cross sectional view of the nozzle taken along line 10—10 of FIG. 8.

DESCRIPTION OF THE PREFERRED EMBODIMENT

Referring more particularly to the drawings, reference numeral 12 indicates a machine for forming and shaping potato dough into french fry shaped pieces. Except in the particulars described in detail hereinafter, apparatus 12 is substantially identical to that disclosed in U.S. Pat. No. 3,771,937. The apparatus includes an impervious cylindrical chamber 14 that is open at both ends to define a discharge opening 16 and a rear opening 18. The rear portion of the upper wall of cylindrical chamber 14 defines an inlet opening 20 through which inlet opening the dry potato agglomerate and water constituents are introduced for forming dough according to the invention. Slidably disposed within cylindric chamber 14 is a piston indicated generally at 22 which is fastened to an operating rod 24 that is driven in reciprocation toward and away from discharge opening 16 via a drive mechanism 26. Because the drive mechanism is substantially as disclosed in the U.S. Pat. No. 3,771,937 patent, it will not be described in detail herein.

Apparatus 12 includes a rigid horizontal wall 28 from which depend a pair of spaced apart mounting brackets as shown in FIG. 3 at 30. Brackets 30 define slots 32 which confront one another in horizontal alignment across the space between the brackets to receive identical mounting lugs 34 that are rigid with the exterior surface of chamber 14 and are adpated to be slidably received within the slots. The slots each have an abutment (not shown) rearward of the front surface of brackets 30 for establishing the proper position of mounting lugs 34 and chamber 14 in the apparatus. On the front surface of each bracket 30 is a headed pin 36 which affords rigid mounting to the machine of a dough dividing structure generally indicated at 38. Dough ejected through dough dividing structure is separated from the dough within chamber 14 by a transverse separator 39 which is driven in windshield wiper fashion across the exterior of dividing structure 38.

Dough dividing structure 38 includes a cylindric flange 40 which defines an interior opening adapted to fit snugly on the exterior diameter of cylinder 14. Extending in diametrical opposition outward of flange 40 are two identical mounting ears 42 which define keyhole shaped openings 44 adapted for engagement over pins 36 so that upon rotation of the structure 38 the entire structure can be quickly inserted onto and removed from the apparatus. Mounting ears 42 have finger grips 46 to facilitate the same. The elements are so proportioned that dividing structure 38, when engaged with pins 36, retains chamber 14 in its operative position.

Integral with cylindric flange 40 is a plurality of thin elongate members or strands 48 which span the opening defined by the flange in parallel spaced apart relation. Strands 48 are uniformly spaced apart from one another by a distance corresponding to the thickness of the french fry shaped pieces formed by the apparatus, typically about one-fourth inch more or less.

The upper and lower regions of dividing structure 38 have integral impervious wall portions 53 which terminate at inward tapering edges 54 that extend parallel to strands 48. Wall portions 53 eliminate formation of sliver-like potato pieces and reinforce the structure.

In order to remove dividing structure 38 and chamber 14 for cleaning, as is necessary after a full day's operation in a restaurant or like environment, it is only necessary to rotate the dividing structure so as to align the relatively large portion of keyhold shaped openings 44 with pins 36. Thereupon the dividing structure is removable as is the chamber by sliding the chamber axially until lugs 34 are clear of slots 32. Because piston 22 contacts the potato dough, it too must be removed for cleaning. FIGS. 4 and 5 disclose the connection or latch between piston 22 and rod 24 which affords such removal.

Piston 22 includes a latch part on the rear surface thereof. The latch part, including a transverse wall 56, which is spaced from the rear surface 58 of the piston to define a slot therebetween. As seen in FIG. 4, wall 56 is excised to define an upward opening channel bounded by a semicircular lower edge portion 60 and two parallel vertical edge portions 62 that are tangent to the semicircular edge portion.

There is a similar shaped but larger slot between wall 56 and surface 58; the larger slot is bounded by a semicircular lower edge portion 64 and two parallel vertical edge portions 66 that are tangent to semicircular edge portion 64. The latch part on the rear of piston 22 is completed by a protuberance 68 extending inward from the upward extremity of one of tangential edge portions 62.

There is a complemental latch part on the outer end of rod 24. See FIG. 5. Adjacent the forward or outer end of rod 24 there is formed a groove having a semicircular surface portion 70 that corresponds to surface portion 60 and from which extend mutually parallel tangential surface portions 72 which correspond with tangential edge portion 62 of the slot defined in the rear surface of piston 22. Piston slot surfaces 62 engage rod slot surfaces 72 to establish the position of the piston on the rod and prevent relative rotation.

Because piston 22 is molded in a unitary structure form suitable thermoplastic material such as nylon, it has a degree of resilience. Accordingly, the piston can be inserted onto and removed from the end of rod 24, because the material yields sufficient to permit protuberance 68 to distort during such insertion and removal.

The front face of piston 22 is rimmed by a relatively thin integral lip 74, which because of its thinness and because piston 22 is constructed of nylon or the like is sufficiently flexible to form a substantially watertight or sealing relationship with the inner wall of chamber 14. Inward of lip 74 is an annular groove 76. Inward of annular groove 76 the piston has a planar surface 78 which is spaced in an axial direction behind the axial extremity of lip 74. A flexible diaphragm 80 rests against planar surface 78 at its central region and has an annular projection 81 which is shaped complementally to groove 76 so as to fit snugly therein.

For securing diaphragm 80 to piston 22 there is integral with the diaphragm a rearward extending post 82 which has a radially outward extending protuberance 84 spaced from the rear face of the diaphragm by an amount corresponding to the thickness of the piston. The wall of the piston defines a slot 86 which is sized to receive post 82. The diaphragm, post and protuberances are made of rubber so that there is sufficient deformability to permit insert of the post through slot 86. It will be noted that post 82 and slot 86 are spaced remote from the axial centerline of the piston so that the remote portion of diaphragm 80 is free to separate from the planar surface 78 of the piston. Adjacent slot 86 the wall of the piston defines one or more airvent openings 88, which airvent openings are closed by diaphragm 80 when the diaphragm rests against planar piston surface 78. This construction permits the piston to be moved rearward away from contact with a body of dough within chamber 14 because the lower portion of diaphragm 80 pulls away from planar surface 78 in response to retraction of the piston so as to establish an air path through openings 88, between the diaphragm and the piston, and around the edge of the piston.

As explained in somewhat more detail in the above noted patents, dough is formed within chamber 14 by introducing thereinto a quantity of dry potato agglomerate through a chute 90 and water through a nozzle 92. An impervious barrier spanning discharge opening 16 is essential to retain the constituents within the chamber until the water has been absorbed into the potato agglomerate and the mixture has set into a firm dough. According to the present invention a body of dough 93 is retained in chamber 14 to define the barrier during normal operation of the apparatus. The barrier has an axial dimension or thickness of about 1½ inches which in one system designed according to the invention is equal to about one-half the thickness of a full charge of dough. After the apparatus has been cleaned, it is essential to form an initial charge of dough within chamber 14 so that the impervious barrier is present for subsequent machine operations. For this purpose apparatus 12 includes a base plate 94 below the chamber and its associated parts. Secured to base plate 94 in vertical alignment below dry product chute 90 and water nozzle 92 is a piston supporting stud 95. The piston supporting stud has adjacent the surface of base plate 94 a cylindric portion having a diameter corresponding to semicircular edge portion 60 of the slot in piston 22. At the upper end of such cylindric portion stud 95 has a larger cylindrical portion which has a diameter corresponding to semi-circular surface 64 in the piston slot. Accordingly, the piston when removed from rod 24 can be engaged with stud 95 so as to support the piston, face up, in vertical alignment below chute 90 and nozzle 92. Because base plate 94 has a horizontal planar surface surrounding stud 95 and because the rim of cylinder 14 that defines discharge opening 16 resides in a plane transverse of the axis of the chamber, the chamber when placed upon the piston 22 is supported by base plate 94 in a vertical position with rear opening 18 in vertical alignment below dry product chute 90 and nozzle 92. See FIG. 2. The dry product and water delivery system can then be activated in a normal fashion and because cylinder 14 and piston 22 are in vertical alignment below chute 90 and nozzle 92, the constituents will be deposited into chamber 14. The potato agglomerates are uniformly wetted, and after a suitable time interval (e.g. 30 - 90 seconds) a firm dough D is formed in the chamber. The dough has sufficient firmness that when chamber 14 is raised upward, the dough will remain in the chamber, there being no vacuum therewithin by virtue of the presence of diaphragm 80 as described above. The chamber is set aside; piston 22 is disengaged from stud 95 and is installed on rod 24 by interengagement of the latch members described above. Then chamber 14 is installed by engaging lugs 34 in slots 32 after which dividing structure 38 is secured. The machine is then operated to dispense half the initial dough charge through discharge opening 16. The dough mass remaining within the chamber constitutes impervious barrier 93 for formation of subsequent batches of dough. Accordingly the need for extra plugs or seal plates is eliminated with the advantage of simpler cleaning and freedom from concern about loose parts.

In normal operation, i.e. after the chamber 14 has been initially charged, the dry product and water are introduced through inlet opening 20 into chamber 14 which is disposed in the horizontal orientation shown in FIG. 1. In order to effect uniform wetting of the dry product, first the dry product is introduced through chute 90 and then water is supplied through nozzle 92. In order for the correct quantity of water to be introduced through nozzle 92 in a short period of time, water is supplied to the nozzle via a pump as more fully disclosed in U.S. Pat. No. 3,771,937. It is not desirable however that the water be sprayed at high velocity since such impairs the uniform distribution of the water throughout the dry product. According to the present invention nozzle 92 is constructed so that the velocity or kinetic energy present at the inlet of the nozzle is dissipated within the nozzle whereby the sole force acting on the water as it exits the nozzle is the force of gravity. Moreover, the water is distributed uniformly across the transverse dimension of the chamber. A nozzle for achieving this desirable mode of operation is shown in FIGS. 6 - 10. The nozzle generally includes an inner rigid tube 96 and an outer tube 97 mounted concentric with the inner tube and sized to define an annular space therebetween. The water is introduced through a conduit or pipe 98 into the inner tube whereupon it flows through holes in the inner tube that define passages to the annular space between the inner tube and the outer tube. Because the volume of the annular space is substantial compared to the volume of the inner tube, virtually all the velocity or kinetic energy in the water is dissipated and the water falls by gravity through openings provided in the outer tube.

Inner tube 96 defines a central opening of circular cross section which converges or tapers slightly from the inlet to which pipe 98 is connected to the end remote from the inlet end. Accordingly, the pressure is substantially constant along the central opening of inner tube 96. Radiating outward from the exterior surface of inner tube 96 are circular discs 100 and 102 which support outer tube 97 relative to the inner tube and divide the volume between the inner and outer tubes into three longitudinally spaced chambers identified respectively in FIG. 8 at 104, 106 and 108. Chambers 104 and 108 are of substantially equal volume and chamber 106 is of relatively smaller volume. The upper portion of the outer surface of inner tube 96 that is within chambers 104, 106 and 108 defines a horizontal surface 110, which extends chordally of the nozzle center-line. As can be seen most clearly in FIG. 9 the length of the chord is somewhat less than the diameter of the central opening of inner tube 96. The presence of chordal surface 110 not only enlarges the volume of chambers 104, 106 and 108, but defines the location for the passages that extend from the inner opening of tube 96 to the chambers between the inner and outer tubes. The longitudinal edges of chordal surface 110 form a convenient line to form such holes. Extending into chamber 108 there are six holes 112 that, as can be seen in FIG. 8 and 10, extend vertically and are disposed at the edge of chordal surface 110. The holes are symmetrical of the center line so that water passing therethrough loses substantial velocity in impinging on the upper region of the inner surface of outer tube 97. The holes into chamber 104 are identified at 114 and can be eight in number. Holes 114 are formed adjacent opposite edges of chordal surface 110 and are disposed in pairs uniformly spaced along chamber 104. Into central chamber 106 there are two holes 116 of relatively larger diameter. The number and location of holes 112, 114 and 116 is such that the water is introduced into chambers 104, 106 and 108 in accordance with the longitudinal dimension of the respective chambers. The water flows around the annular space between the inner and outer tubes as shown in FIGS. 9 and 10, and loses whatever residual velocity it may still have because of the relatively large volume of the annular spaces.

There are three outlet openings corresponding respectively to volumes 104, 106 and 108, the outlet openings being identified as 104a, 106a and 108a. The outlets are formed at the bottom of outer tube 97 so as to assure that water flowing therefrom will flow downward into chamber 14. Openings 104a and 108a are substantially identical and have a length corresponding to the lengths of the chambers with which they respectively communicate. In alignment with openings 104a and 108a the outer surface of inner tube 94 defines a V-shaped extension the sides of which are tangent to the circular shape of inner tube 96 and the apex 118 of which is in vertical alignment with the midpoint of outlet 108a. The V-shaped extension assists in dissipating any velocity remaining in the water and guides it into movement in a downward direction through outlet 108a. Outlet 106a is circular in shape and discharges water from chamber 106 with little or no velocity other than that due to the force of gravity reacting on the water. Thus because the water is supplied to inner tube 96, conveyed upwardly through passages 112, 114 and 116 and then downward through the annular chambers between the inner and outer tubes it possesses virtually zero velocity, other than due to the force of gravity, when it egresses through outlet openings 104a, 106a and 108a. In addition, the water egressing the outlet openings is distributed substantially uniformly along the length of nozzle 92; for example in one device having the proportions of FIG. 8, twice as much water flows from each of openings 104a and 108a as flows from opening 106a. Thus the nozzle of the present invention permits introduction of a substantial quantity of water into chamber 14 in a short time and in a uniformly distributed manner without significant kinetic energy or velocity that could well adversely affect the uniformity of the dry product mass.

Although outer tube 97 functions as a unitary element, it is constructed of an upper part 97a and a lower part 97b for convenience of construction and assembly. The parts of the outer tube are fixed together along a plane extending horizontally through the nozzle.

In describing the operation of the apparatus of this invention in detail, it will be assumed that the apparatus has been cleaned and requires initial charging to form impervious barrier 93 within chamber 14. First, diaphragm 80 is installed onto piston 24 by engaging post 82 within a slot 86. The piston is then engaged in a face-up relation onto stud 95 by engaging the large diameter portion of the stud into the slot on the rear surface of the piston. Cylinder 14 is placed over the piston with the discharge end 16 downward and the rear end opening 18 upward. When the rear end opening 18 is upward, inlet opening 20 will also be upward. Thereupon the apparatus is activated, whereupon it supplies preselected amounts of dry product through chute 90 and water through nozzle 92 into the chamber. As described in U.S. Pat. No. 3,622,355 the constituents combine without mixing or agitation to form a relatively stiff potato dough. The setting time is in the range of about 30 seconds to 90 seconds, depending principally on the temperature of the water supplied through nozzle 92.

When the dough has set, removal of chamber 14 from piston 22 and base plate 94 will carry the dough mass with it. The charged chamber is set aside and piston 22 can be removed from stud 95 and installed onto rod 24. The latching mechanism between the piston and rod assures correct orientation, i.e. with air vent passages 88 in the upper or top region of the piston. With the piston in place, cylinder 14 is installed by engagement of lugs 34 in slots 32 and the assembly is completed by installation of dough dividing structure 38. See FIG. 3. The apparatus is then cycled and about one-half of the initial dough charge is discharged through opening 16 for formation into shaped bodies by cooperation of dividing structure 38 and separator 39. There is then an impervious barrier 93 that spans discharge opening 16 so that formation of subsequent charges of dough can proceed. The dough is formed, as explained in somewhat more detail in U.S. Pat. No. 3,771,937 by activating the dry product and water supply systems to deposit dry product through chute 90 and water through nozzle 92 into the chamber. Piston 22 is then moved leftward as viewed in FIG. 1 to a position where the dry product and water are consolidated into a volume that extend from about the left hand extremity of inlet opening 20 to the surface of impervious barrier 93. The piston is retained in the consolidate position at least until the constituents set into a firm dough. Thereafter when it is desired to dispense french fry shaped pieces, the machine is activated by the operator and piston 22 moves leftward to urge the dough through discharge opening 16 and the spaces between strands 48. When the dough has been ejected by an amount corresponding to the thickness of a french fried piece transverse cutter 39 is automatically activated to separate the projecting strips whereupon piston 22 is caused to move forward another increment. Because of the large open area between the strands 48 of dividing structure 38 a small amount of pressure is required.

The driving mechanism 26 is arranged so as to limit the forward most movement of piston 22 so as to retain in chamber 14 a dough body that defines impervious barrier 93. Thereupon piston 24 is retracted. Because lip 74 of the piston forms a substantially airtight seal with the chamber wall and because impervious barrier 93 also creates an airtight seal, there is a tendency on reversal or retraction of piston 22 to form a vacuum between the piston and the impervious dough barrier. The first consequence of such vacuum is that diaphragm 80 tends to remain in contact with the rear surface of impervious dough barrier 93 and as seen in broken lines in FIG. 5 the region of diaphragm 80 remote from post 82 pulls away from planar piston surface 78. Such movement continues until there is opened an air passage through piston passage 88 behind diaphragm 80 and around the edge of the diaphragm. As can be seen in FIG. 5, the outside diameter of diaphragm 80 is somewhat less than the inner diameter of chamber 14 so as to permit establishment of an air passage around the periphery of the diaphragm. In any event when the air passage is opened, the vacuum between the piston and the impervious dough barrier is broken so that the piston moves rearward without adversely affecting the integrity of the dough barrier.

As the piston is moved rearward to the position shown in FIG. 5 and then forward to the above mentioned "consolidate" position, dry product and water are introduced into chamber 14 from chute 90 and nozzle 92. The quantity of water, as more fully explained in U.S. Pat. No. 3,771,937, is metered by activating a pump for a preselected duration. Because the pump delivers water through pipe 98 to nozzle 92 at substantial velocity, in order to deliver the required amount of water within a reasonable time duration (about 2 seconds), the construction of nozzle 92 in dissipating such velocity is important. The water enters the central passage in inner tube 96, passes upward through openings 112, 114 and 116, and then falls down and around the outer surface of the inner tube for discharge through outlets 104a, 106a and 108a. Because of the construction of nozzle 92, the water is symmetrically distributed into the chamber without significant velocity other than that due to the force of gravity acting on the water. Accordingly, the water distributes itself uniformly throughout the potato agglomerate residing in the chamber. After the piston is moved to the "consolidate" position and after a delay for the constituents to set into a firm dough, the apparatus is ready for forming and dispensing additional french fry shaped pieces.

When it is desired to disassemble the apparatus for cleaning, dividing structure 38 is removed by disengaging keyhole slots 44 from pins 36. Removal of the dividing structure 38 permits removal of chamber 14, piston 22, and diaphragm 80. Because impervious barrier 93 is a relatively small volume, e.g. one and one-half inches in thickness, it can be discarded without significant waste. The parts can then be thoroughly washed, and cleanliness and long life is assured because the important parts are of unitary construction formed from molded plastic.

Thus it will be seen that the present invention provides improved dough forming and shaping apparatus which in addition to being less complex than similar apparatus described in the above noted patents is easier to clean, is superior in forming and shaping the dough and is far less expensive to manufacture. Moreover, because of the improved dough charging arrangement provided according to the present invention there are no loose parts which require care or storage.

Although one embodiment of the invention has been shown and described, it will be obvious that other adaptions and modifications can be made without departing from the true spirit and scope of the invention.

We claim:

1. In apparatus for reconstituting dehydrated potato agglomerates by adding water to the agglomerates to form dough and for shaping the dough into shaped potato pieces, said apparatus being of the type having an impervious wall defining an elongate chamber of uniform cross-sectional shape, means mounting said chamber on a generally horizontal axis, said chamber being open ended to define a discharge opening at one end thereof and a rear opening opposite the discharge opening, a piston movable in said chamber, means extending through said rear opening and operative to move said piston toward and away from said discharge opening to effect discharge of dough through said discharge opening, dough shaping means supported adjacent said discharge opening shaping dough discharged from said chamber by movement of said piston toward said discharge opening, a first latch element on said piston moving means and a second latch element on said piston that is removably interengageable with said first latch element to effect removable attachment of said piston to said piston moving means, said chamber wall having an upward open side opening adjacent said rear opening, and means operative to introduce into said chamber through said side opening preselected amounts of potato agglomerates and water, the improvement for forming an impervious dough barrier spanning said discharge opening comprising supporting means interengageable with said second latch element supporting said piston in a substantially horizontal plane, means mounting said supporting means in vertical alignment below said introducing means, and means positioning said chamber upon the piston when the piston is engaged on said supporting means in substantially vertical disposition, said positioning means being disposed to position said chamber so that said piston is within said chamber adjacent said discharge opening thereby to form an impervious receptacle thereabove for receiving agglomerates and water from said introducing means.

2. Apparatus according to claim 1 wherein said chamber positioning means includes a base plate having an upper horizontal planar surface disposed below said introducing means, said piston supporting means being disposed in a medial region of said planar surface so that the edge of said chamber that defines said discharge opening rests on the portion of said planar surface surrounding said piston supporting means.

3. Apparatus according to claim 2 wherein said second latch element includes a wall integral with said piston, said wall having a portion spaced from the rear surface of said piston, said wall portion defining a laterally open slot, said piston supporting means having a first portion adjacent said planar surface sized for entry into said slot, said piston supporting means having a second portion remote from said planar surface that defines an abutment for engaging said wall portion, said second portion being sized to fit intermediate said wall portion and said piston.

4. Apparatus according to claim 3 wherein the said slot is defined by a substantially semicircular edge and two parallel straight edges tangent to the semicircular edge, said first portion of said supporting means being cylindrical and having a diameter corresponding to that of said semicircular edge, there being a deformable protuberance on one of said straight edges for engaging the first portion of said supporting means to retain said piston thereon.

5. Apparatus according to claim 1 wherein said piston defines a substantially planar face opposite said second latch element, a flexible impervious diaphragm adapted to overlie said planar surface, means for attaching a limited region of said diaphragm to said piston so that the diaphragm remote from said attaching means is free to separate from said planar surface, the piston defining an airvent opening adjacent said attaching means, said diaphragm separating from said planar piston surface in response to relative movement of said chamber and said piston to open said airvent opening and relieve vacuum in said chamber.

6. In apparatus for forming dough into shaped pieces wherein the apparatus is of the type having a dough chamber defining at one end thereof a discharge opening, a piston slidable in said chamber, means operable to controllably reciprocate said piston toward and away from said discharge opening, and shaping means adjacent said discharge opening for shaping dough egressing therefrom in response to movement of said piston toward said discharge opening, the improvement comprising a portion of said piston facing said discharge opening defining a substantially planar rigid support surface, a flexible impervious diaphragm substantially congruent to said support surface, means for attaching said diaphragm in overlying relation to said planar support surface, said attaching means being confined interior of the periphery of said diaphragm to thereby allow movement of the periphery of the diaphragm, and an airvent passage in said piston extending from said planar support surface to the opposite side of said piston so that when said piston is moved away from dough in said chamber a portion of said diaphragm is peeled away from said planar surface to afford an air path through said airvent passage and around said diaphragm.

7. Apparatus according to claim 6 wherein said attaching means is confined to the upper region of said piston and diaphragm so that the lower region of the diaphragm can separate from the planar piston surface in response to movement of the piston away from dough in said chamber.

8. Apparatus according to claim 7 wherein said attaching means is disposed substantially midway between the horizontal extremities of said piston and wherein said airvent passage is defined by two holes extending through said piston and being symmetrically disposed on opposite sides of said attaching means.

9. Apparatus according to claim 6 in combination with means for removably securing said piston to said piston reciprocating means, said securing means comprising a first latch element on said reciprocating means and a second latch element on said piston interengagable with said first latch element, said latch elements including indexing means for inhibiting rotation of said piston in said chamber.

10. Appartus according to claim 9 wherein said indexing means comprises a portion of said first latch member defining a noncircular rod surface on said piston reciprocating means, said second latch member having a wall defining a slot bounded in part by an edge surface complemental to said rod surface, and means for retaining said surfaces in contact with one another.

11. Apparatus according to claim 6 wherein said piston defines a peripheral groove circumscribing said planar surface, said diaphragm having a projection shaped complementally of said groove and adapted to fit therewithin when said diaphragm resides in contact with said planar surface.

12. Apparatus according to claim 11 wherein said piston defines an integral flexible lip extending radially outward into sealing relationship to said cylinder, said groove and the periphery of said diaphragm being disposed radially inward of said lip.

13. Apparatus for forming potato agglomerates and water into a dough and for shaping the dough into french fry shaped pieces comprising a chute for delivering a preselected quantity of potato agglomerates along a vertically downward path, a water nozzle adjacent to said chute for delivering a preselected amount of water along a vertically downward path, said nozzle including inner and outer hollow cylindrical walls defining an annular space therebetween, means for delivering water at substantial velocity to the interior of the inner cylindrical wall, a plurality of upwardly extending passages through the inner wall for delivering water to the annular space intermediate the inner and outer wall, and a plurality of outlet openings in the lower region of the outer cylindrical wall, an impervious cylinder having a side inlet opening, means removably supporting the cylinder along a horizontal axis with the inlet opening in vertical alignment below said chute and said nozzle, said cylinder being open ended to define a discharge opening at one end thereof and a rear opening at the opposite end thereof, a piston for slidable sealing movement within the cylinder, said piston having a substantially planar surface facing said discharge opening, a flexible impervious diaphragm configured to overlie said planar surface, means securing an upper portion of said diaphragm to said piston so that said diaphragm remote from said securing means is separable from said planar surface, an airvent passage through said piston and disposed adjacent to said diaphragm securing means so that when said diaphragm is moved away from said piston an air passage is formed around said diaphragm, a rod extending through said rear opening, said rod and said piston having complementally interengagable latch members for removably retaining said piston to said rod, said latch members acting to retain the piston in a position so that said diaphragm securing means is upward, means operative to controllably reciprocate said rod so as to move said piston toward and away from said discharge opening, means in vertical alignment below said chute and said nozzle mounting said piston with the planar surface thereof orientated horizontally and facing upward, said piston mounting means having a shape corresponding to the latch member on said rod so as to removably mount said piston below said chute and said nozzle, a planar horizontal surface circumscribing said piston mounting means to support said discharge end of said chamber so that said chamber is disposed in substantially vertical alignment below said chute and said nozzle for charging said cylinder with potato agglomerates from said chute and water from said nozzle, and means mountable on said cylinder in spanning relation to said discharge opening dividing dough exiting said discharge opening in response to movement of said piston toward said discharge opening.

* * * * *